(12) United States Patent
Aasmul et al.

(10) Patent No.: US 6,533,183 B2
(45) Date of Patent: Mar. 18, 2003

(54) CODING OF CARTRIDGES FOR AN INJECTION DEVICE

(75) Inventors: Søren Aasmul, Holte (DK); Jens Ulrik Poulsen, Virum (DK)

(73) Assignee: Novo Nordisk A/S, Bagsvaerd (DK)

( * ) Notice: Subject to any disclaimer, the term of this patent is extended or adjusted under 35 U.S.C. 154(b) by 0 days.

(21) Appl. No.: 09/846,799

(22) Filed: May 1, 2001

(65) Prior Publication Data

US 2002/0000471 A1 Jan. 3, 2002

Related U.S. Application Data

(60) Provisional application No. 60/204,343, filed on May 15, 2000.

(30) Foreign Application Priority Data

May 3, 2000 (DK) ......................................... 2000 00727

(51) Int. Cl.$^7$ ................................................. G06K 7/10
(52) U.S. Cl. ................................... 235/494; 235/462.01
(58) Field of Search .............................. 235/462, 472, 235/454, 468, 470, 494, 495

(56) References Cited

U.S. PATENT DOCUMENTS

| | | | |
|---|---|---|---|
| 3,809,863 A | | 5/1974 | Oberg |
| 4,327,283 A | | 4/1982 | Henman et al. |
| 4,625,101 A | | 11/1986 | Hinks et al. |
| 4,810,867 A | | 3/1989 | Speicher |
| 4,930,263 A | | 6/1990 | Rando |
| 4,978,335 A | | 12/1990 | Arthur, III |
| 5,059,776 A | * | 10/1991 | Antes ........................ 235/454 |
| 5,091,798 A | | 2/1992 | Hibino |
| 5,196,683 A | * | 3/1993 | Marom et al. ......... 235/462.01 |
| 5,317,506 A | | 5/1994 | Coutré |
| 5,336,871 A | * | 8/1994 | Colgate, Jr. ................. 235/380 |
| 5,379,131 A | * | 1/1995 | Yamazaki ................... 235/457 |
| 5,422,472 A | * | 6/1995 | Tavislan et al. ............ 235/472 |
| 5,432,329 A | * | 7/1995 | O'Boyle et al. ............ 235/487 |
| 5,461,239 A | * | 10/1995 | Atherton ..................... 250/566 |
| 5,747,350 A | | 5/1998 | Sattler |
| 5,793,502 A | * | 8/1998 | Bianco et al. ................. 359/2 |
| 5,821,524 A | | 10/1998 | Horlbeck et al. |
| 5,882,463 A | | 3/1999 | Tompkin et al. |
| 5,954,700 A | | 9/1999 | Kovelman |
| 6,019,745 A | | 2/2000 | Gray |
| 6,053,415 A | * | 4/2000 | Norwood ..................... 235/493 |
| 2002/0000471 A1 | * | 1/2002 | Aasmul et al. ......... 235/462.45 |

FOREIGN PATENT DOCUMENTS

| | | |
|---|---|---|
| EP | 398 717 | 11/1990 |
| EP | 0492954 A2 * | 1/1992 |
| EP | 492 954 | 7/1992 |
| EP | 626 660 | 11/1994 |
| EP | 833 273 | 4/1998 |
| FR | 2771111 | 5/1999 |
| GB | 2216259 | 10/1989 |
| GB | 2336927 | 11/1999 |
| JP | 63100303 | 5/1988 |
| JP | 2250083 | 10/1990 |
| JP | 4233684 | 12/1992 |
| JP | 8106648 | 4/1996 |
| JP | 8179475 | 7/1996 |
| JP | 8220994 | 8/1996 |
| JP | 8262980 | 10/1996 |
| JP | 916703 | 1/1997 |
| JP | 9192220 | 7/1997 |
| JP | 10268777 | 10/1998 |
| JP | 11180079 | 7/1999 |
| JP | 200040119 | 2/2000 |
| WO | WO 95/24317 | 9/1995 |

* cited by examiner

Primary Examiner—Thien M. Le
(74) Attorney, Agent, or Firm—Marc A. Began, Esq.; Richard W. Bork, Esq.; Reza Green, Esq.

(57) ABSTRACT

A cartridge (1) for an injection device carries a code represented by a number of bars (2, 3, 4, 5) mainly perpendicular to the axis of the cartridge. The bars (2, 3, 4, 5) are mainly transparent and are each along its whole length provided with an optical grating which diffracts and reflects light impinging the surface carrying the code so that a minor part of this light is reflected from the surface of the bar as a set of light beams of which beams at least one is detected for the indication of the presence of the bar when said bar passes a reading light field. The reflections from the bars may be interpreted as representing "1"s and "0"s in a binary code.

19 Claims, 6 Drawing Sheets

CODING OF CARTRIDGES FOR AN INJECTION DEVICE

CROSS REFERENCE TO RELATED APPLICATION

This applications claims the benefit of priority under 35 U.S.C. §119 of U.S. Provisional Application No. 60/204,343, filed May 15, 2000 and Danish application PA 2000 00737, filed May 3, 2000.

BACKGROUND OF THE INVENTION (1) Field of the Invention

The invention relates to codes represented by a number of bars which code is read by a reading head when the bars are illuminated.

(2) Description of Related Art

Such codes may be used on cartridges for injection devices so as syringes and pumps.

Patients who have to receive frequent injections often use a so-called pen injector by which wanted doses can be apportioned from a cartridge in the injector. When empty the cartridge can be replaced by a new full one. Another possibility is to use a so-called pump by which very small doses are infused with short time spacing. Also the pumps get the liquid to be infused from a changeable cartridge in the pump.

The cartridges have to carry printed information revealing the content of the cartridge. This information can be printed directly on the cartridge or on a label, which is glued to the cartridge. Further it is wanted that the cartridge carry a code defining a unique identification of the cartridge and its content and which code can be automatically read by a code reader. Such a code reader is appropriately mounted in the syringe or the pump using the cartridges, so that the code is automatically read when a cartridge is mounted in the injection device. This enables the injection device to display the information of the content of the cartridge on a display or to reject a cartridge containing medication, which was not prescribed or not meant for the injection device.

To enable visual inspection of the content of the cartridge such a cartridge is mainly made from a transparent material and a label with printed text and codes has to be at least partly transparent. The printed text leaves some place between the letters and between the lines and the text does not have to cover the whole surface of the cartridge.

Differently it is with the coding. To describe the problems we will look upon a commonly used cartridge which has the shape of a cylindrical glass tube which is at one end closed by a membrane which can be pierced by a needle through which the liquid in the cartridge can be pressed out by pressing a piston, which closes the other end of the tube, into said tube.

The code is commonly provided as a bar code having bars extending perpendicularly to the longitudinal axis of the cartridge. To ensure safe reading of the code maximum contrast between bars and spaces is aimed at. Consequently the bars are black opaque lines. A reader in the injection device reads this code when the cartridge is passed in its axial direction into the device. However, unless the rotational position of the cartridge is carefully watched during the mounting of the cartridge you cannot be sure that the bars of the code passes the reading field of the reader. Making the bars extend all the way around the cartridge will solve this problem but makes visual inspection of the content of the cartridge difficult in the part covered by the bar code. The code area may be restricted to the about 1 cm where the piston is positioned when the cartridge is full as inspection is not needed in this area.

For commercially available bar codes using ordinary printing technique on labels the minimum basic module corresponding to the thinnest bar or the smallest space is about 0.2 mm. Even with this fine basic module the 1 cm space will only leave space for very limited information. As a common bar code needs a number of start and stop bits, which informs the reader that a bar code is going to be read and further a number of check bits to provide sufficient redundancy to make the code insensitive to noise, the amount of information is further reduced.

Another source of failures which makes it impossible to use the fine basic module described above is the fact that it is difficult to wind the label around the cartridge with a sufficient precision. Where the edges of a label meet the ends of a bar may be displaced several tenth of a millimeter relative to each other. This calls for a coarser basic module for the bar code if errors shall be avoided when the reading of the bar code takes place along a line where the edges of the label meet.

SUMMARY OF THE INVENTION

An objective of the invention is to describe a machine-readable code for identifying the labeled content of cartridges, by which code the above-mentioned problems are avoided or mitigated.

This is obtained by a code represented by a number of bars which code is read by a reading head when the bars are illuminated, characterized in that the bars are mainly transparent and each along its whole length is provided with an optical grating which diffracts and reflects light impinging the surface carrying the code so that a minor part of this light is reflected and diffracted from the surface of a bar as a set of light beams of which beams at least one is chosen to be detected for the indication of the presence of said bar and the information stored in this bar when said bar is illuminated by a reading light.

A cartridge may carry a code represented by a number of bars mainly perpendicular to the axis of the cartridge, and the bars may be mainly transparent and each may along its whole length be provided with an optical grating which diffracts light impinging the surface carrying the code so that a minor part of this light is reflected diffracted from the surface of the bar as a set of light beams of which beams at least one is chosen to be detected for the indication of the presence of the bar when said bar passes a reading light field.

The reading may be performed by successive illuminating the bars when they pass a reading device during the insertion of the cartridge in a device using such cartridges.

When the bars are mainly transparent they may be distributed over the whole length of the cartridge without disturbing the visual inspection of the content of the cartridge and the better space which is thereby provided may be used for more information and for the provision of a larger space between the bars. The larger bars, and larger spacings between the bars, leads to reduced precision requirements for the optical parts of the reading head, which in turn allows for a low-cost construction of the reading head.

The optical gratings do not have to form an integral structure covering the bar. The bar may be composed of spaced stripes, dots or little islands carrying a grating and filling up the area of the bar where the spacing between the stripes, dots or little islands is smaller than the minor dimension of the reading light field.

The orientation of the lines of the grating may vary from bar to bar so that the planes defined by the sets of diffracted interference beams from different bars has different orientations.

If orientations are so chosen that each bar has a grating with one of two defined orientations, reflections from the bands may be interpreted as representing "1"s and "0"s in a binary code. When two defined orientations of the grating lines are used the two directions may appropriately be perpendicular to each other and be so oriented on the bars that they forms an angle of 45° with the edges of these bars.

The grating may be provided as fine reflecting lines on the bars or by a corrugation in the bar areas of the surface of the material carrying the bars.

The corrugation may be provided as alternating ridges and grooves in the bar areas of the surface of the material carrying the bars.

The cross-section of the corrugation may have the shape of sinusoidal waves, square waves or saw tooth waves.

The bars may be distributed over the whole length of a cartridge, which may be a rotational symmetrical ampoule with bars having the shape of round going bands.

Especially when a cartridge is made of a plastic material the gratings may be made in the surface of the cartridge itself but may also be provided on a label, which is glued to the cartridge.

The code is described in connection with its use on cartridges for medical devices but may arbitrarily be used where a common bar code will deteriorate the appearance or impede inspection of the part carrying the code.

BRIEF DESCRIPTION OF THE DRAWINGS

In the following the invention is described in further details with references to the drawing wherein.

DETAILED DESCRIPTION OF THE INVENTION

Figure 1:
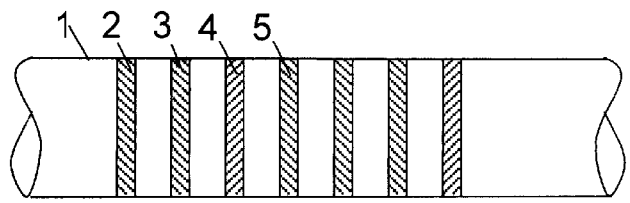
FIG. 1 shows schematically an ampoule provided with round going bands provided with optical gratings.

FIG. 1 shows schematically a cartridge formed as a cylinder ampoule 1 which is along its length provided with a number of spaced bands 2, 3, 4, 5, which bands extends all the way round the ampoule perpendicular to the longitudinal axis of this ampoule and are each provided with a structure forming an optical grating. The orientation of the gratings on the individual bands varies from band to band. However, in the shown example the orientation of the gratings of the bands is one of two defined orthogonal directions which forms an angle of 45° with the edges of the bands or with a generatrix of the cylindrical cartridge. The bands 2, 3, and 5 are oriented in one of the two defined orthogonal directions and band 4 in the other. In this example two main directions are chosen to obtain a binary code, but more possible directions could be chosen to obtain codes with a higher basic number. With two main directions orthogonal orientations are chosen to obtain maximal discrimination between the reflected beams representing the "0"s and "1"s. The 45° angles with the generatrix are chosen to obtain an expedient position of the detectors.

Figure 2:
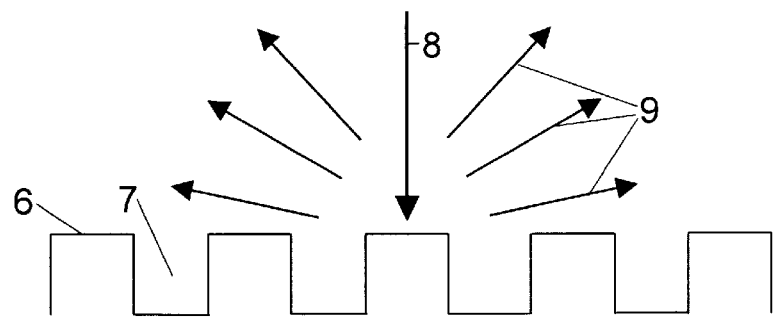
FIG. 2 shows schematically a cross section of an optical grating provided by a rectangular wave corrugation of a surface.

The optical gratings on the bands are provided by a corrugation of the surface of the material of the cartridge or of a label sticking to that cartridge. The corrugation may be made so that the cross section of the grating has the rectangular wave shape shown in FIG. 2, which schematically shows how the surface is provided with ridges 6 and groves 7. Further it is schematically illustrated how an impinging light beam arriving in one direction indicated by the arrow 8 is diffracted in different directions indicated by the arrows 9. As the material of the cartridge and its possible label is transparent most of the impinging light will pass without diffraction, but a minor part of the light passing the grating structure of the surface will be diffracted and a minor part of the light impinging on the surface will be diffracted in the directions indicated by the arrows 9. These directions, which represents diffraction of first, second, third etc. order, can be calculated on the basis of the wave length of the impinging light and the dimensions of the grating using the formula $$n \cdot \sin \theta = d\lambda$$

where n is the order of the beam, d is the distance between the lines of the grating, and $\lambda$ is the wavelength of the impinging light. It is seen that the use of monochromatic light will ensure well defined beams whereas the use of white light will make each beam appear as a rainbow colored fan.

Figure 3:
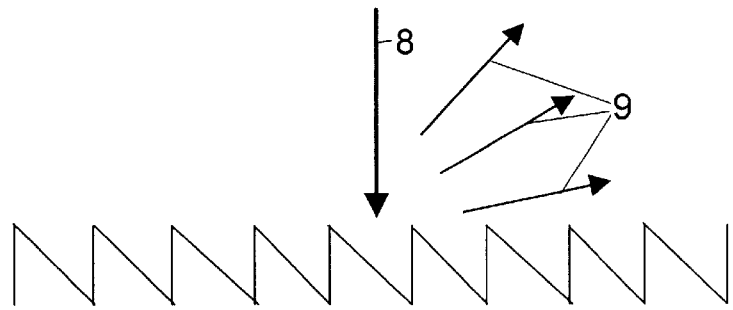
FIG. 3 shows schematically a cross section of an optical grating provided by a saw tooth corrugation of a surface.

If a corrugation with saw tooth shaped cross-section as shown in FIG. 3 is used, the impinging light is only reflected in directions on one side of the impinging beam as illustrated by the arrow 8 for impinging light and the arrows 9 for reflected interference light beams. By this kind of gratings the directions of two gratings representing a "0" and a "1" respectively can be rotated 180° relative to each other, whereas 90° is maximum by the gratings having the shape shown in FIG. 2.

Figure 4:
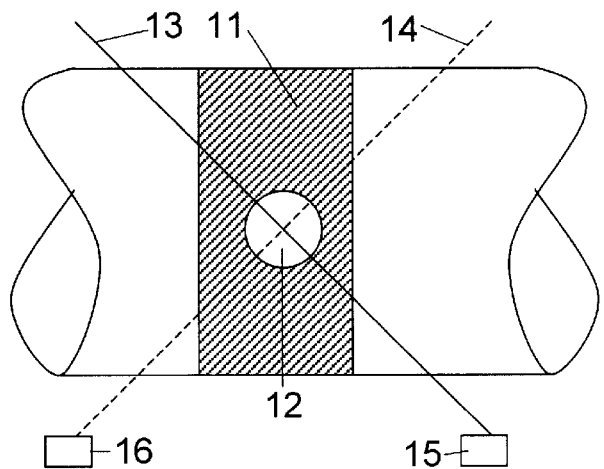
FIG. 4 shows schematically how a beam of light impinging a band with an optical grating is reflected and diffracted, FIG. 5 corresponds to FIG. 4 where the band is composed by dots having an optical grating.

FIG. 4 shows a part of the cartridge seen in the direction of the impinging light. A band extending all the way round the cartridge is provided with a grating with an orientation of the ridges in the surface as indicated by lines 11 in said direction. A part of a light beam impinging the surface of the band in the area 12 will be diffracted in beams in a plane indicated by the line 13. With a grating orthogonal to the one indicated by the lines 11 the diffracted beams will be found in a plane indicated by the dotted line 14. Detectors 15 and 16 in the respective planes are so positioned that each of them can detect a diffracted interference beam of a chosen order from the band. If the grating of the band in question is oriented as indicated in FIG. 4, the interference beam will hit the detector 15 whereas an interference beam from a band with a grating orthogonal to the one indicated will make the resonance beam hit the detector 16. This way a signal from one detector can represent a "0" and a signal from the other can represent a "1". A concomitant signal from both detectors indicates that both detectors are hit by scattered reflection from the surface of the cartridge outside the bands, whereas signals from none of the detectors indicates that the light beam is impinging on an absorbing or non-reflecting area which is not a band.

With the described code a signal from one and only one of the detectors 15 or 16 indicates that a band belonging to the code is passing the detector. By ordinary bar codes where variation in the light caused by alternating bars and spaces of varying width is detected and forms the information, it is necessary to start with a certain sequence of bars and spaces to make the reader know that a code is going to be read. Without such a start code random variations in the light may erroneously be interpreted as information.

Figure 5:
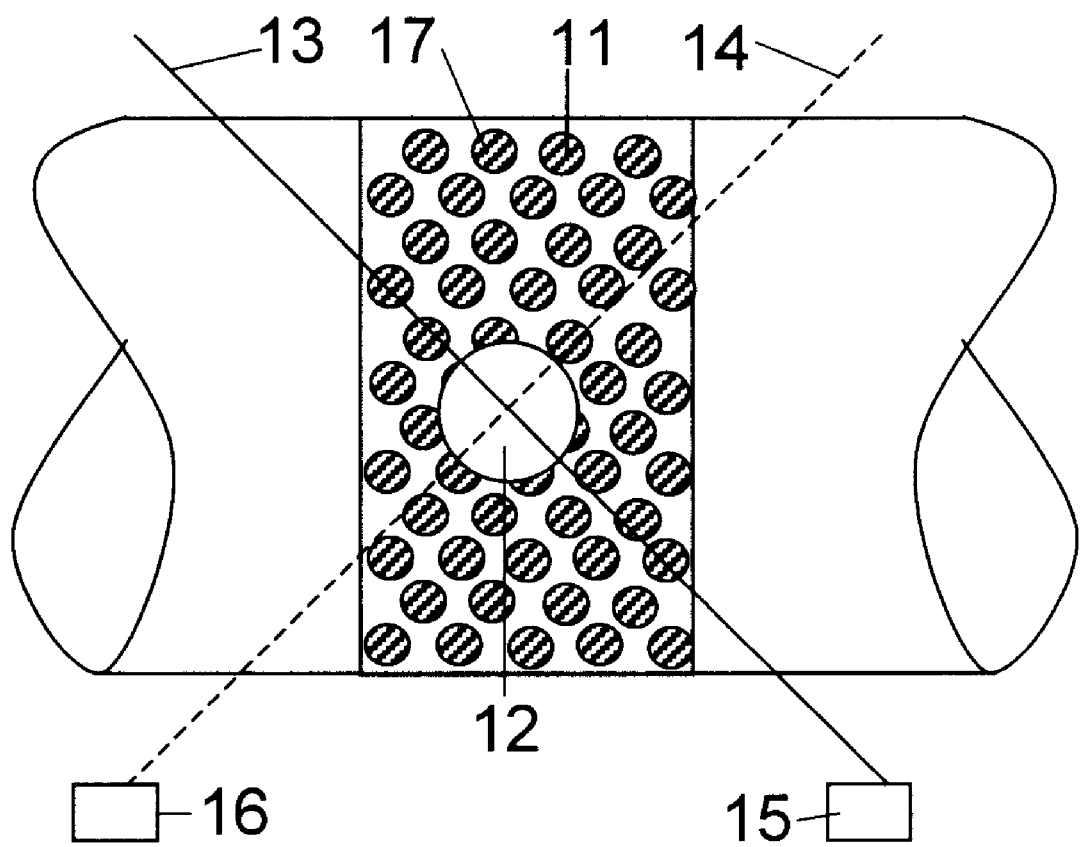

In FIG. 5 it is illustrated how the single bands may be composed by dots 17 which carries an optical grating as long as the diameter of the reading light field covering the area 12 and the spacing between the dots 17 are so adapted that at least one dot is covered by the light field. The grated areas are here shown as circular dots but could as well be stripes or little islands having regular or irregular shapes. If any part of an area carrying gratings lies within the reading light field a signal is received by one of the detectors 15 or 16.

Figure 6:
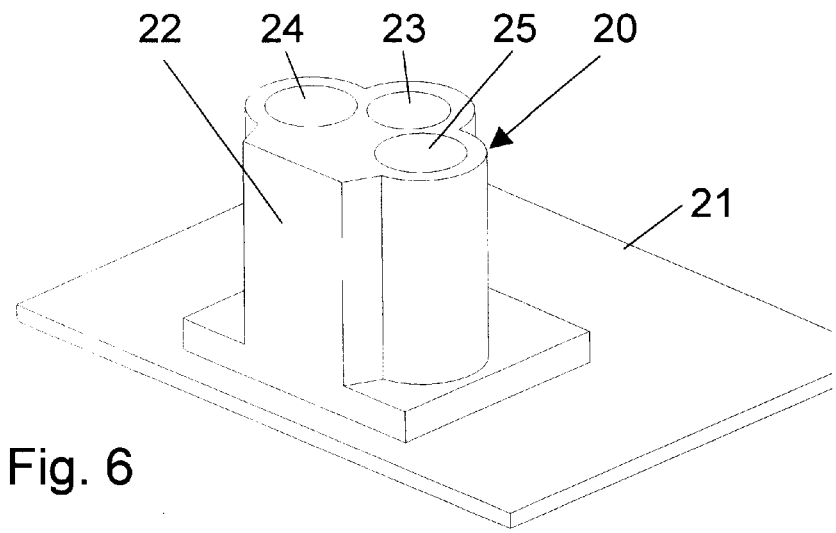
FIG. 6 shows a reading head mounted on a circuit board, FIG. 7 corresponds to FIG. 6 with half of the reading head cut away, FIG. 8 a phantom picture of FIG. 7, FIG. 9 corresponds to FIG. 7 with the ray paths indicated.

The light source and the detectors are electronic components which are designed to be mounted on a circuit board. However, the light source should be so positioned that the impinging light beam is mainly perpendicular to the surface carrying the code to be read, and the detectors should be so placed that the chosen diffracted light beam hits them. To meet these demands a reading head 20 as shown in FIG. 6 is provided. The reading head 20 is made from a transparent material an can be mounted on a circuit board 21 and has a surface 22 through which light is send to and received from the code which is read by the reader. In the reading head as shown in FIG. 6 is provided a hole 23, which is of importance to the path of ray of light for the light source beam, and holes 24 and 25 which are of importance to the diffracted reflected beams.

Figure 7:
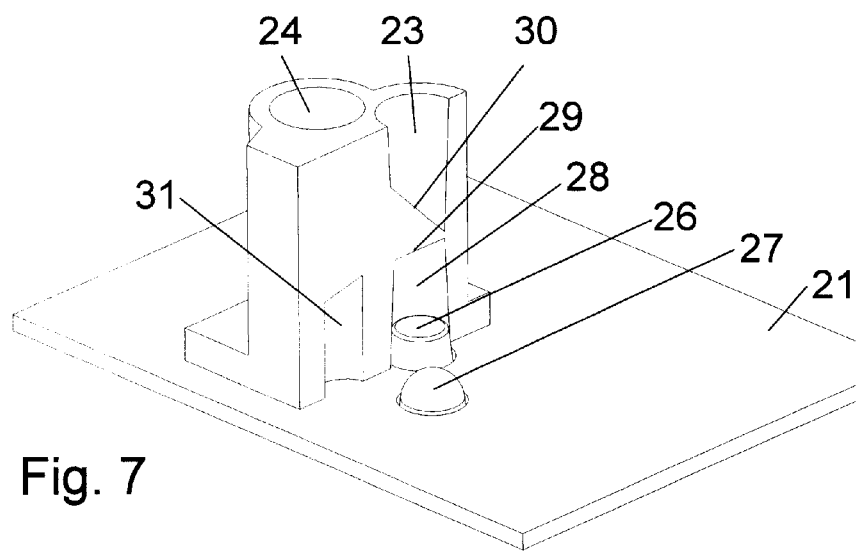

FIG. 7 shows a sectional view of the reading head. Here an output window 26 of the light source and an input window 27 of one of the detectors is seen. Over the output window 26 of the light source a hole 28 is provided in the material of the reading head 20, which hole is upward confined by a surface 29 perpendicular to the direction of the light from the light source through which surface the light pass without being diffracted. The light beam will hit an oblique surface 30 at the bottom of the hole 23 and will be reflected in a horizontal beam perpendicular to the surface 22. The light detectors are similarly mounted on the circuit board 21 in holes, which are upward confined by surfaces parallel with the circuit board and above which oblique surfaces are provide at the bottom of the holes 24 and 25. However, here the paths of rays are the opposite as the diffracted beams fall through the surface 22 to be reflected by the oblique surfaces at the bottom of the holes 24 and 25 to finally hit the detectors. The hole 31 is provided to form an aperture for the light beam from the light source to form an appropriate light spot on the code bars.

Figure 8:
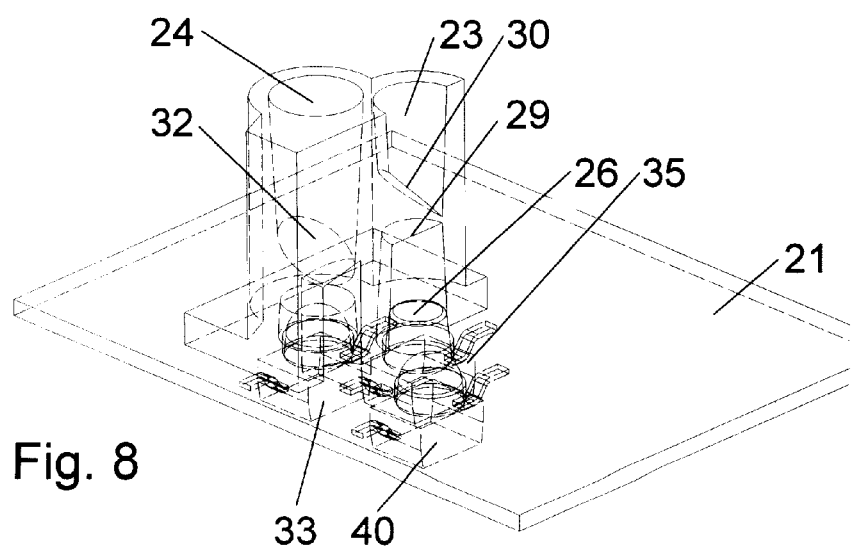

FIG. 8 shows a phantom picture of the reading head 20 on the circuit board 21 to illustrate how reading head and the light source and detectors are mounted on opposite sides of this circuit board, and to illustrate the presence of a totally reflecting surface 32 at the bottom of the hole 24, which surface directs a reflected diffracted beam towards a detector 33.

Figure 9:
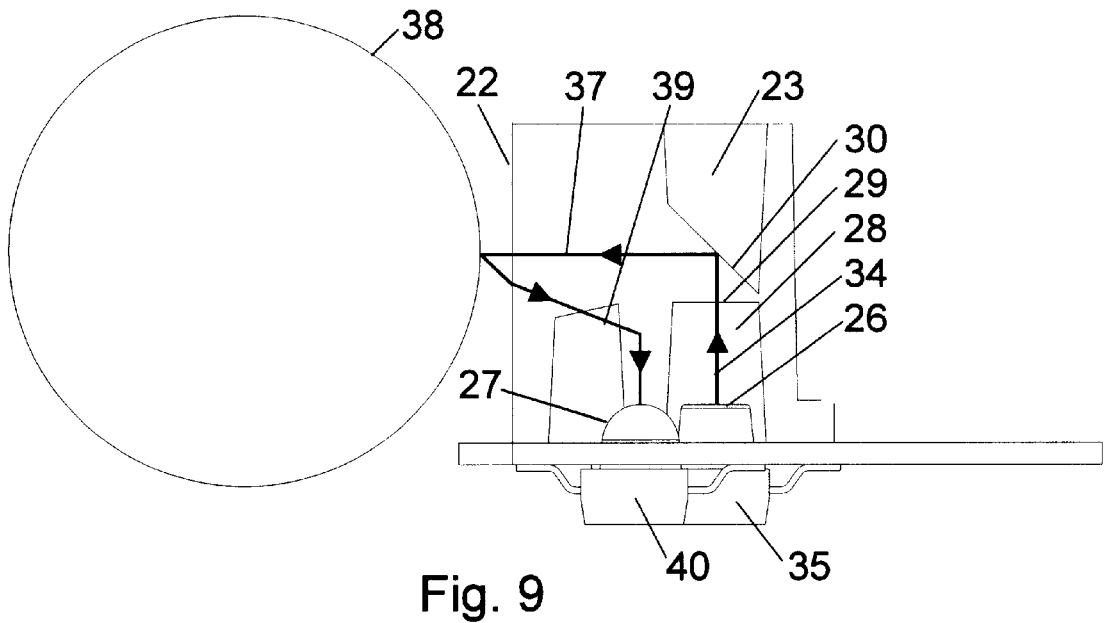

FIG. 9 shows sectional side view of the reading head 20 mounted on the circuit board 21 and illustrates the path of rays. A light beam 34 from the light source 35 emits from the output window 26 of this light source, passes through the surface 29, and hits the surface 30 by which it is reflected as a beam 37 which passes through the surface 22 of the reading head to hit the code to be read on a cartridge 38. Depending on the direction of the relief pattern in the read code bar a reflected refracted beam 39 is sent towards the totally reflecting surface at the bottom of one of the holes 24 or 25. The beam 39 shown in FIG. 9 is a beam diffracted towards the not shown totally reflecting surface at the bottom of the hole 25 by which surface the beam is directed into the input window 27 of the detector 40.

Figure 10:
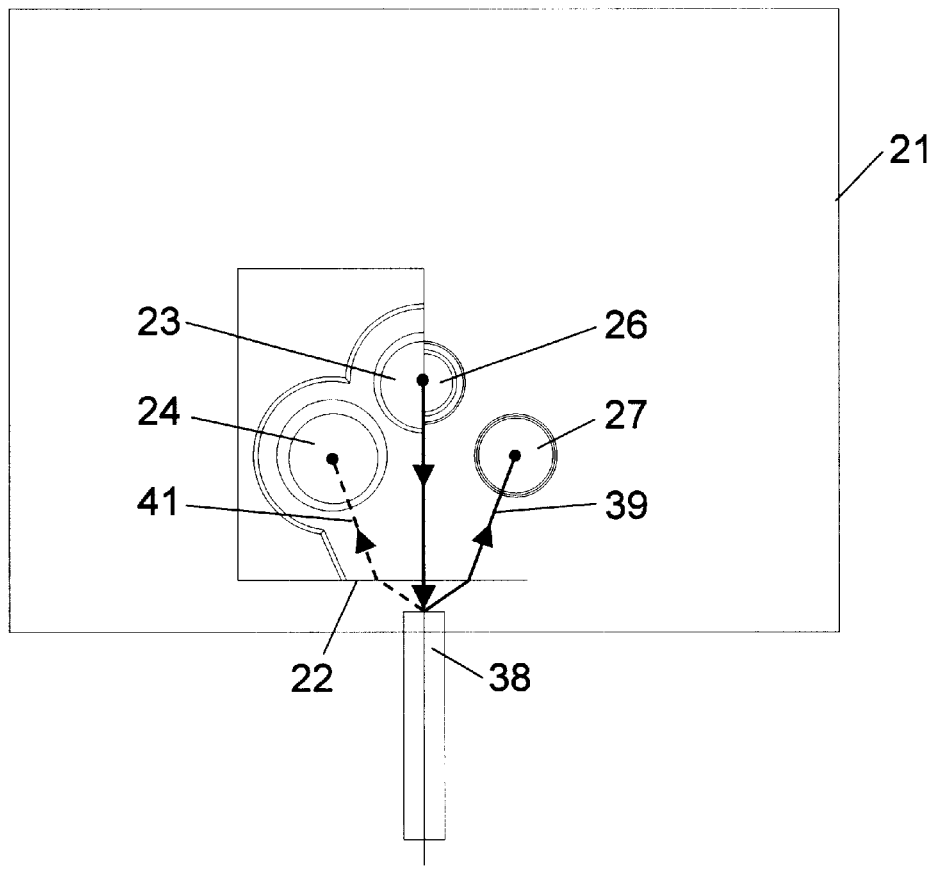
FIG. 10 shows a top view of FIG. 9.

FIG. 10 shows a top view of the reading head in FIG. 9 and illustrates that the diffracted beam from the code on the cartridge 38 may be diffracted towards the hole 24 and be reflected by the totally reflecting surface 32 at the bottom of this hole to enter through the input window of the detector 33. This possible diffracted beam is shown as the dotted line 41. It shall be noticed that due to the fact that the beams 39 and 41 do not impinge the surface 22 perpendicularly these beams are slightly refracted when passing this surface.

The signals from the two detectors of the reflected diffracted light are used for detection of the code encoded in the holographic fields.

Figure 11:
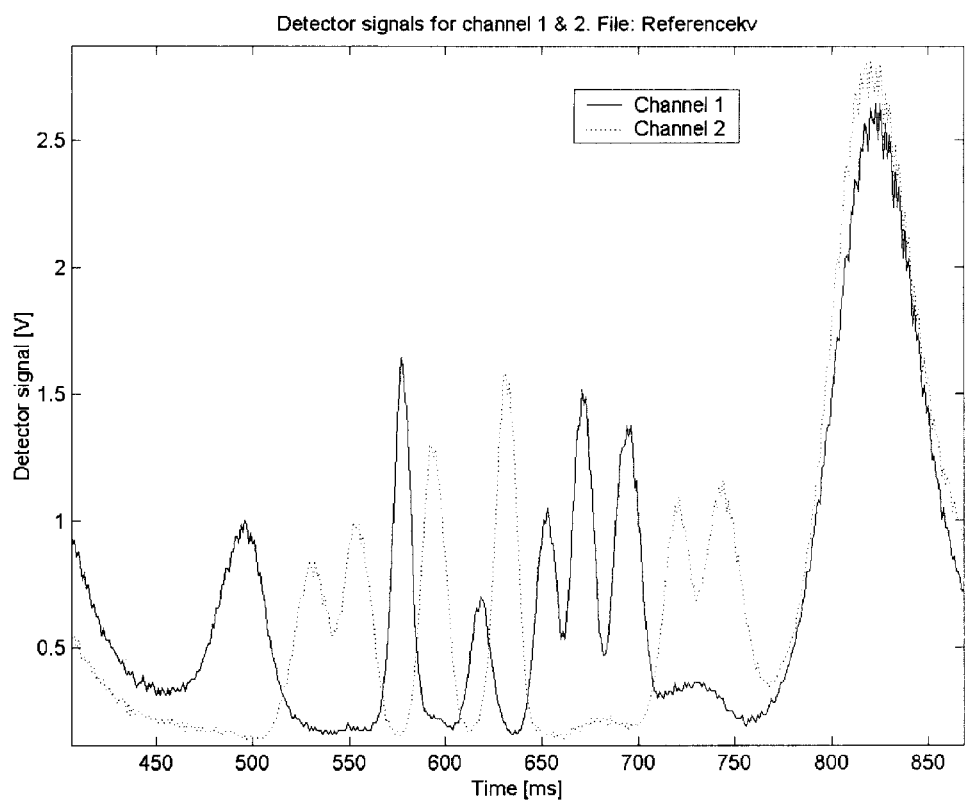
FIG. 11 shows realistic detector signals.

A typical set of signals from the two detectors is illustrated in FIG. 11.

The purpose of the detection system is to extract the code information from the detector signals.

Two fundamentally different detection principles exists:
1. A primarily hardware based system.
2. A primarily software based system.

Hardware Based System

The hardware based detection system operates by using a fixed detection threshold for each channel, such that any signal below this level is "low", whereas any signal above is "high".

Figure 12:
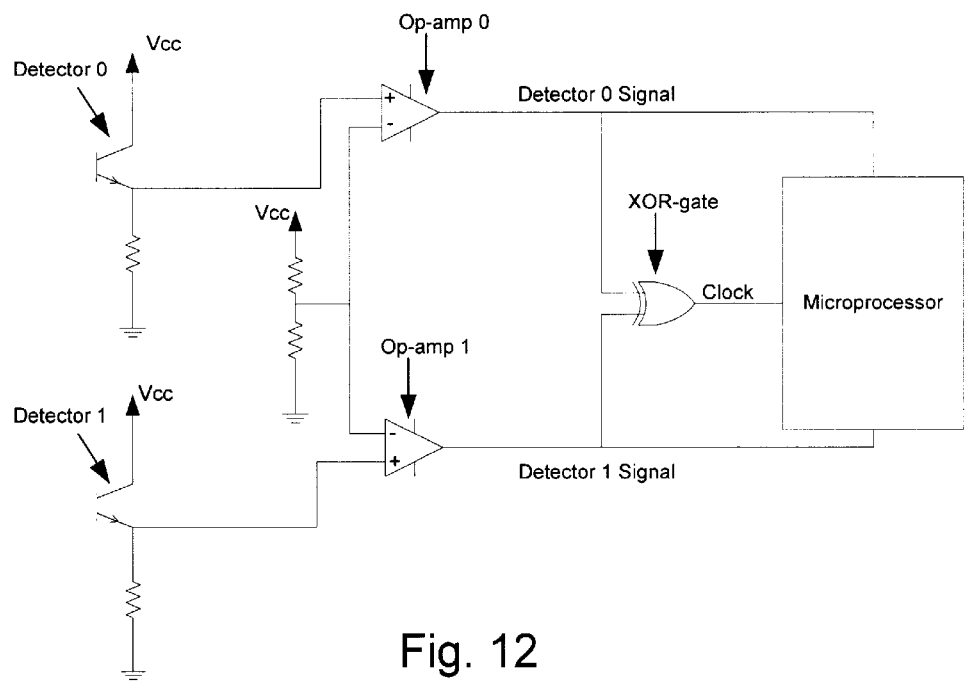
FIG. 12 shows schematically a primarily hardware based detection system.

The thresholded signals from the two detection channels 0 and 1 may be analyzed for a valid signal by employing the XOR principle, i.e. that if a valid signal exists there will be a "high" signal in one channel only. This condition may be detected by a hardware part denoted an XOR-gate, and the output from this gate used to signal to e.g. a microprocessor that a valid signal is present, by generating a clock signal. This is illustrated in FIG. 12.

When the microprocessor receives the clock signal it reads the value of the detector 0 and 1 signals and from this determines the corresponding value of the code bit.

Software Based System

Figure 13:
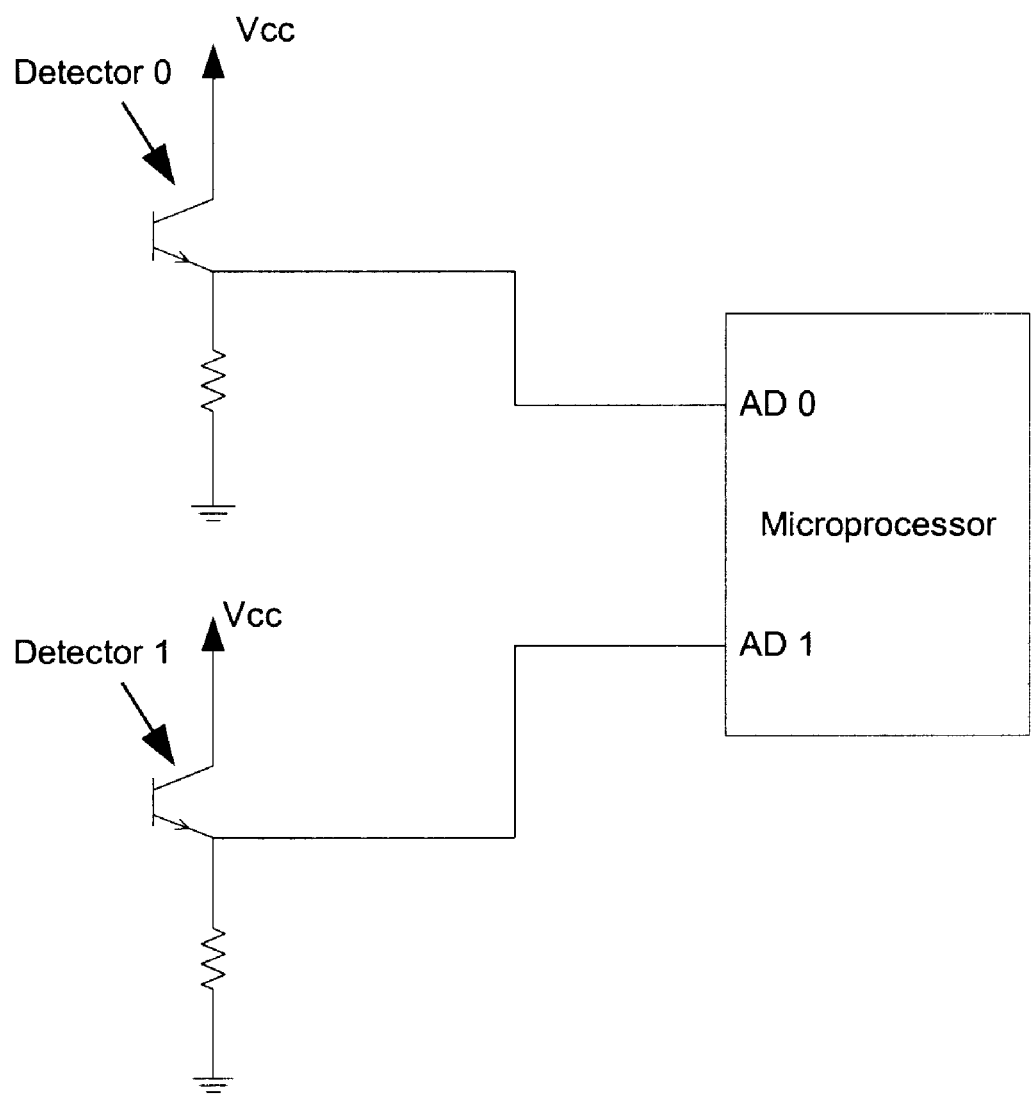
FIG. 13 shows schematically a primarily software based detection system.

The software based detection system operates by converting the two analog signals from the optical detectors to digital form and subsequently analyzing the signals stored in digital form. This is illustrated in FIG. 13.

The analog signals from detectors 0 and 1 are led to analog-to-digital converters AD0 and AD1, preferably included in the microprocessor of the system. The AD-converters converts the data to digital form.

When the data is recorded a code detection algorithm is used to extract the code information embedded in the detector signals. Using a software based system results in larger requirements for the microprocessor when compared to the hardware based system, but it also opens possibility for employment of more advanced detection principles. This includes suppression and filtering of noise in the detector signals, compensation for varying sensitivities of the detectors, etc.

What is claimed is:

1. A code comprising a plurality of bars, wherein the bars are mainly transparent and each along its whole length is provided with an optical grating that diffracts and reflects light impinging upon a surface carrying the code so that a minor portion of the light is reflected and diffracted from the surface of a bar as a set of light beams of which at least one is chosen to be detected for indication of the presence of the bar and information stored in this bar when the bar is illuminated by a reading light, and wherein the grating of each bar contains lines and wherein the orientations of the lines of the gratings are chosen so that each bar has a grating with one of two defined orientations, whereby reflections from the bars may be interpreted as representing "1s" and "0s" in a binary code.

2. A code as in claim 1, wherein the two directions are orthogonal.

3. A code as in claim 2, wherein the two directions each form an angle of 45 degrees with edges of the bars.

4. A code as in claim 1, wherein the gratings are provided as fine reflecting lines on the bars.

5. A code as in claim 4, wherein the gratings are provided by a corrugation of the surface of material in the bar area.

6. A code as in claim 5, wherein the corrugation is provided as alternating ridges and groves.

7. A code as in claim 6, wherein the corrugation has a cross section in the shape of a square wave.

8. A code as in claim 6, wherein the corrugation has a cross section in the shape of a saw tooth wave.

9. A cartridge for an injection device comprising a code, the code comprising a plurality of bars, wherein the bars are mainly transparent and each along its whole length is provided with an optical grating that diffracts and reflects light impinging upon a surface carrying the code so that a minor portion of the light is reflected and diffracted from the surface of a bar as a set of light beams of which at least one is chosen to be detected for indication of the presence of the bar and information stored in this bar when the bar is illuminated by a reading light, and wherein the grating of each bar lines and wherein the orientations of the lines of the gratings are chosen so that each bar has a grating with one of two predefined directions, whereby reflections from the bars may be interpreted as representing "1s" and "0s" in a binary code.

10. A code as in claim 9, wherein the two directions are orthogonal.

11. A code as in claim 10, wherein the two directions each form an angle of 45 degrees with edges of the bars.

12. A code as in claim 9, wherein the gratings are provided as fine reflecting lines on the bars.

13. A code as in claim 9, wherein the gratings are provided by a corrugation of the surface of material in the bar area.

14. A reading head for reading a code having a plurality of bars, wherein the bars are mainly transparent and each along its whole length is provided with an optical grating that diffracts and reflects light impinging upon a surface carrying the code so that a minor portion of the light is reflected and diffracted from the surface of a bar as a set of light beams of which at least one mat be chosen to be detected for indication of the presence of the bar and information stored in this bar when the bar is illuminated by a reading light, and wherein the grating of each bar lines and wherein the orientations of the lines of the gratings are chosen so that each bar has a grating with one of two defined orientations, whereby reflections from the bars may be interpreted as representing a numeric code, the reading head comprising:

a surface through which light to and from a reading point can pass, a surface in which an output window from a light source and input window for a light detector can be adopted, a means for changing the direction of the light beams from the light source towards the reading point, and a means for changing the direction of the beams from the reading point to the detectors.

15. A reading head according to claim 14, wherein the reading head is moulded in a transparent material.

16. A reading head according to claim 14, wherein the reflections from the bars may be interpreted as a binary numeric code comprising "1s" and "0s."

17. A code containing information about a product, the code comprising:

a plurality of bars that are primarily transparent,
the bars being comprised of:
an optical grading that diffracts and reflects light as a set of light beams that are capable of being read by a reading apparatus,
the optical grading on the bars comprising:
a plurality of lines,
wherein the lines are aligned in one of at least two predefined orientations.

18. The code according to claim 17 wherein the lines are not a continuous structure but are comprised of a plurality of dots, spaced stripes, or islands.

19. The code according to claim 17 wherein the two predefined orientations are chosen so that the lines of one bar are orthogonal to the lines of an adjacent bar.

* * * * *